United States Patent [19]

Schlaefer et al.

[11] Patent Number: 4,837,002
[45] Date of Patent: Jun. 6, 1989

[54] REMOVAL OF CHLORATE FROM CAUSTIC SODA

[75] Inventors: Dieter Schlaefer, Ludwigshafen; Wolfgang Kochanek, Weisenheim; Bernd Leutner, Frankenthal, all of Fed. Rep. of Germany

[73] Assignee: BASF Aktiengesellschaft, Ludwigshafen, Fed. Rep. of Germany

[21] Appl. No.: 158,745

[22] Filed: Feb. 22, 1988

[30] Foreign Application Priority Data

Mar. 11, 1987 [DE] Fed. Rep. of Germany ....... 3707713

[51] Int. Cl.$^4$ ................................. C01D 1/04
[52] U.S. Cl. .................................. 423/641; 423/183; 423/643
[58] Field of Search ................. 423/183, 641, 643

[56] References Cited

U.S. PATENT DOCUMENTS

| | | | |
|---|---|---|---|
| 2,415,798 | 2/1947 | Pye et al. | 23/184 |
| 2,562,169 | 7/1951 | Brumbaugh | 23/184 |
| 2,622,009 | 12/1952 | Neubauer et al. | 423/643 |
| 3,325,251 | 6/1967 | van den Akker | 423/641 |
| 4,055,476 | 10/1977 | Benezra et al. | 204/98 |
| 4,372,924 | 2/1983 | Porter | 423/643 |
| 4,643,808 | 2/1987 | Samejima | 204/98 |
| 4,676,971 | 6/1987 | Cooper et al. | 423/183 |

FOREIGN PATENT DOCUMENTS

| | | | |
|---|---|---|---|
| 70998 | 6/1978 | Japan | 423/641 |
| 9446 | 3/1981 | Japan | 423/641 |
| 724439 | 3/1980 | U.S.S.R. | 423/183 |
| 945070 | 11/1980 | U.S.S.R. | |
| 922070 | 4/1982 | U.S.S.R. | 423/641 |
| 642946 | 9/1950 | United Kingdom . | |
| 664023 | 1/1952 | United Kingdom . | |
| 798006 | 7/1958 | United Kingdom . | |
| 1156227 | 6/1969 | United Kingdom | 423/641 |
| 1523979 | 9/1978 | United Kingdom | 423/641 |

OTHER PUBLICATIONS

Gmelins Haudbirch der anorganischen Chemi, 8th edition, supplementary volume instalment 1, "Natrium", pp. 86-87.

*Primary Examiner*—John Doll
*Assistant Examiner*—Wayne A. Langel
*Attorney, Agent, or Firm*—Keil & Weinkauf

[57] ABSTRACT

Chlorate is removed from aqueous caustic soda by reducing with iron pentacarbonyl and separating off the resulting iron oxide containing precipitate.

3 Claims, No Drawings

REMOVAL OF CHLORATE FROM CAUSTIC SODA

A known byproduct in the preparation of chlorine, and NaOH by the diaphragm process is sodium chlorate, which is present in solution in the caustic soda formed. This byproduct interferes with many applications, since it is a strong oxidant and in consequence has a corrosive action on many engineering materials. For this reason there are many prior art processes for removing this component (cf. Gmelin's Handbuch der anorganischen Chemie, 8th edition, supplementary volume instalment 1 "Natrium", pages 86 to 87). These processes can be subdivided into 3 groups, namely 1. processes based on extraction
2. processes employing ion exchanger resins
3. processes where the interfering chlorate is reduced to the chloride which is present in the caustic soda in any case.

While the processes of the first two groups are unlikely to become important in industry, the processes of group 3 appear to be more interesting for use in industry. Various reducing agents have already been disclosed for the reductive removal of the chlorate.

In British Pat. No. 642,946, the chlorate is reduced with hydrogen in the presence of hydrogen-activating metallic catalysts at from 150° to 300° C. and superatmospheric pressure. This process is disadvantageous, inter alia, because of the high temperatures and high pressure required.

U.S. Pat. No. 2,562,169 recommends reducing the chlorate with alkali metal sulfites, in which case, however, the caustic soda obtained is contaminated with sulfates.

Nor is contamination of the caustic soda avoidable in the process described in GB Patent No. 664,023, where succrose is used as reducing agent. This process has the further disadvantage that it must likewise be carried out at relatively high temperatures of above 150° C. The same is true of a process described in SU Patent No. 945,070, where the reducing agent used is cellulose.

In U.S. Pat. No. 2,415,798, the chlorate is reduced with iron powder at temperatures above about 60° C., preferably above 100° C. Here the disadvantage is, however, that the iron used in from 2- to 5-fold stoichiometric excess needs to be quickly separated from the caustic soda after complete $ClO_3^-$ conversion in order to prevent a further decomposition according to the equation: $2\ NaOH + Fe \rightarrow Na_2FeO_2 + H_2O$). Since the reduction using iron powder is a heterogeneous reaction, the time for complete conversion is a function of the particle surface area and hence of the particle diameter. Minimization of the stoichiometric amount of iron required hence presupposes optimal adaptation of the process to these variable parameters.

This disadvantage is avoidable by following GB-C-No. 798,006 and using iron(II) sulfate as reducing agent in a reaction carried out at from 20° to 80° C. However, this process requires not less than 6 moles of $Fe^{2+}$ per mole of $ClO_3^-$, so that a comparatively large amount of byproduct has to be separated off.

It is an object of the present invention to provide a process which is suitable for removing chlorate from aqueous caustic soda by reducing with an iron compound and separating off the resulting iron oxide containing precipitate and which shall be free of the disadvantages of the existing processes.

We have found that this object is achieved by using iron pentacarbonyl as reducing agent.

Surprisingly, in the process according to the invention, the chlorate present in the caustic soda is reduced not only by the iron but also by the CO coordinated with the iron. This is all the more surprising as neither CO nor sodium formate are capable of reducing the chlorate under the conditions employed, as control tests have shown.

Accordingly, the reduction of the sodium chlorate requires only comparatively small amounts of iron pentacarbonyl. The reaction products found in the treated caustic soda are magnetite ($Fe_3O_4$), sodium carbonate and sodium chloride, so that the reaction according to the invention proceeds substantially in accordance with the following equation:

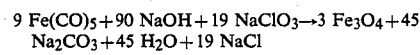

According to this equation, about 0.47 mole of iron pentacarbonyl is required per mole of chlorate to be reduced, but it is advantageous to use an excess of from 0.5 to 3, preferably of from 1 to 2, moles of iron pentacarbonyl per mole of chlorate to be removed. Excess iron pentacarbonyl does not interfere, since evidently it is decomposed into oxidic iron compounds which are separated off together with the magnetite formed.

The reaction can be carried out within a wide temperature range extending from 20° C. to the boiling point of the caustic soda, and it is advantageously carried out under atmospheric pressure. To speed up the reaction, it is advantageous to employ temperatures above 70° C.

The iron carbonyl is mixed into the hot caustic soda at the particular reaction temperature desired. The reaction takes from 0.5 to 10 hours, depending on the preset temperature. The magnetite formed is separated off in a conventional manner, for example by filtration or electromagnetic filtration.

EXAMPLE

For simulation, 3.0 g of the sodium chlorate to be removed were dissolved in 500 ml of 40% strength by weight sodium hydroxide solution. The solution was heated to 80° C., and 3.9 ml (5.7 g) of iron pentacarbonyl were added with stirring. Following a treatment time of 120 minutes there was no longer any detectable chlorate in the sodium hydroxide solution.

Filtration left a substantially colorless sodium hydroxide solution having an iron content of 205 ppm and a carbon content of about 0.1% by weight. The removal of the iron remaining in the sodium hydroxide solution was made possible by concentrating the sodium hydroxide solution to 50% by weight by evaporation of water. The solution became cloudy and was filtered again to reduce its iron content to <10 ppm.

We claim:

1. A process for removing chlorate from aqueous caustic soda by reducing with an iron compound and separating off the resulting iron oxide containing precipitate, which comprises using iron pentacarbonyl as reducing agent.

2. A process as claimed in claim 1, wherein from 0.5 to 3 moles of iron pentacarbonyl are used per mole of chlorate to be reduced.

3. A process as claimed in claim 1, wherein the reaction is carried out within the range from 20° C. to the boiling point of the caustic soda.

* * * * *